May 30, 1950          E. H. WHITE          2,509,948
AIR CONDITIONING SYSTEM
Filed Nov. 25, 1946          3 Sheets-Sheet 1
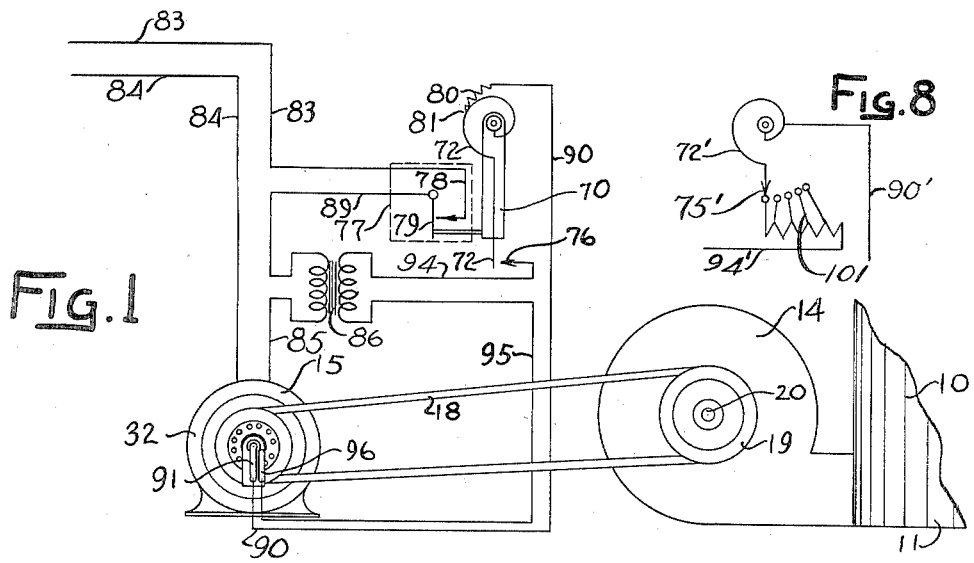
INVENTOR
EVERETT H. WHITE
BY
G. H. Braddock
ATTORNEY May 30, 1950 E. H. WHITE 2,509,948
AIR CONDITIONING SYSTEM
Filed Nov. 25, 1946 3 Sheets-Sheet 2

INVENTOR
EVERETT H. WHITE
BY
G. H. Braddock
ATTORNEY

May 30, 1950     E. H. WHITE     2,509,948
AIR CONDITIONING SYSTEM

Filed Nov. 25, 1946     3 Sheets-Sheet 3

INVENTOR
EVERETT H. WHITE
BY
S. H. Braddock
ATTORNEY

Patented May 30, 1950

2,509,948

UNITED STATES PATENT OFFICE 2,509,948

AIR CONDITIONING SYSTEM

Everett H. White, St. Paul, Minn.

Application November 25, 1946, Serial No. 712,059

5 Claims. (Cl. 236—10)

This invention has relation to an air conditioning system.

An object of the invention is to provide an air conditioning system which will include novel and improved mechanism through the instrumentality of which velocity and volume of air forced to and through a hood or plenum chamber of the air conditioning system can be progressively and accurately controlled and regulated through a selected range of values in response to the temperature in such hood or plenum chamber.

A further object is to provide an air conditioning system which will include a multiple speed drive for a fan or blower of the air conditioning system adapted to cause air to be forced to and through a hood or plenum chamber of said air conditioning system and a novel and improved construction and arrangement whereby the velocity and volume of air forced through said hood or plenum chamber can be progressively and accurately controlled and regulated through a selected range of values by adjustment of said multiple speed drive in response to the temperature in such hood or plenum chamber.

A further object is to provide an air conditioning system which will include a multiple speed drive for a fan or blower of the air conditioning system adapted to cause air to be forced to and through a hood or plenum chamber of said air conditioning system and a novel and improved construction and arrangement whereby the velocity and volume of air forced to and through said hood or plenum chamber can be progressively and accurately controlled and regulated through a range of values from zero to maximum by adjustment of said multiple speed drive in response to the temperature in such hood or plenum chamber and said range of values selectively can be altered at will.

A further object is to provide in the air conditioning system novel and improved mechanism through the instrumentality of which the speed of rotation of a fan or blower of said air conditioning system can be controllably altered in response to changes in temperature of a heat responsive element of the air conditioning system.

A further object is to provide an air conditioning system which will include mechanism through the instrumentality of which the speed of rotation of a fan or blower of said air conditioning system can be controllably altered in response to changes in temperature of a heat responsive element of the air conditioning system, and a novel and improved construction and arrangement whereby a motor for actuating said fan or blower selectively can be rendered operative and inoperative.

A further object is to provide in the air conditioning system various desirable and improved features and characteristics of construction which will be novel both as individual entities of said air conditioning system and in combination with each other.

And a further object is to provide an air conditioning system which will include features and characteristics of construction of the general nature as hereinafter set forth.

With the above objects in view, as well as others which will appear as the specification proceeds, the invention comprises the construction, arrangement and combination of parts as now to be fully described and as hereinafter to be specifically claimed, it being understood that the disclosure herein is merely illustrative and intended in no way in a limiting sense, changes in details of construction and arrangement of parts being permissible so long as within the spirit of the invention and the scope of the claims which follow.

In the accompanying drawings forming a part of this specification:

Fig. 1 is a diagrammatic view of an air conditioning system in which the features and characteristics of the invention are incorporated;

Fig. 2 is an elevational view, with the cover of a casing of the air conditioning system removed, detailing parts of said air conditioning system under the control of a heat responsive element of the air conditioning system;

Fig. 3 is a view, partially in elevation, partially in section and partially broken away, disclosing said heat responsive element, a furnace in which the heat responsive element is incorporated and some of the parts of the disclosure of Fig. 2;

Fig. 8 is a detail view of a modification.

Figure 4:
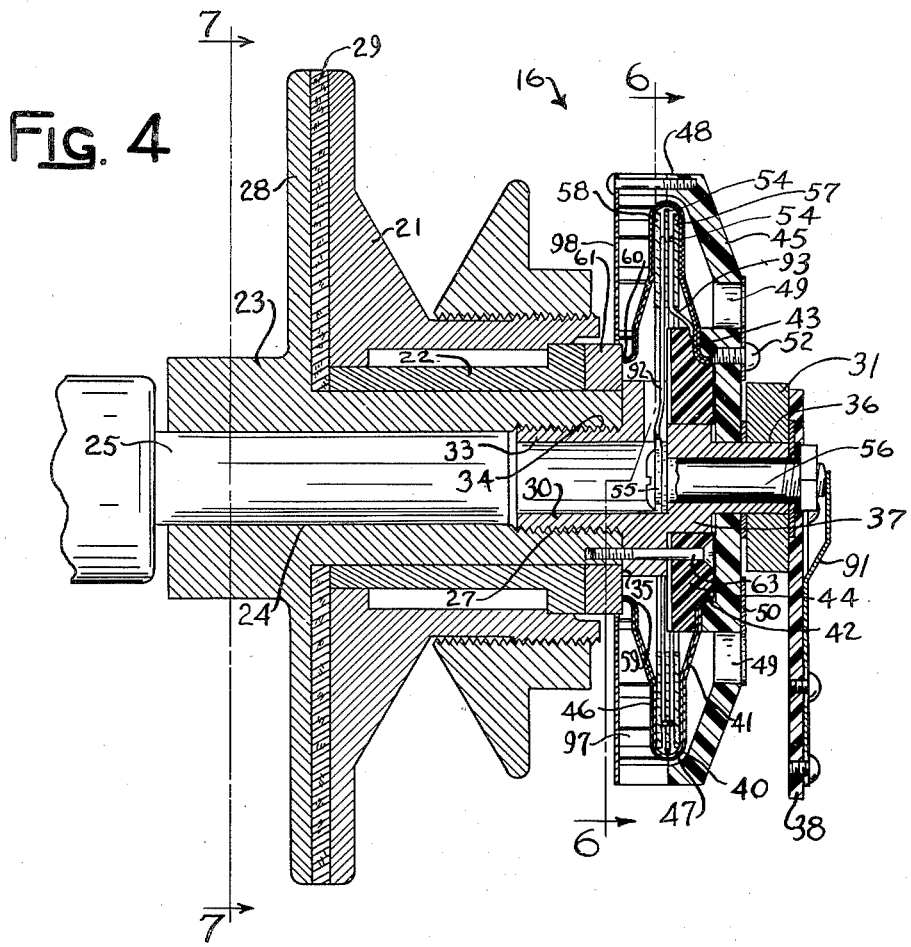
Fig. 4 is a sectional view detailing mechanism of the air conditioning system through the instrumentality of which the speed of rotation of a fan or blower of said air conditioning system can be alterably controlled and regulated.
Figure 5:
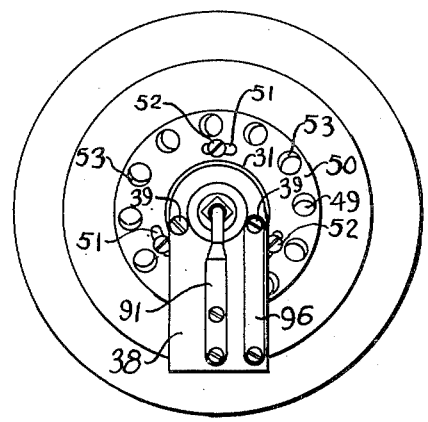
Fig. 5 is an end elevational view, on a reduced scale, of the mechanism disclosed in Fig. 4, showing said mechanism as it would appear from the right side in said Fig. 4.
Figure 6:
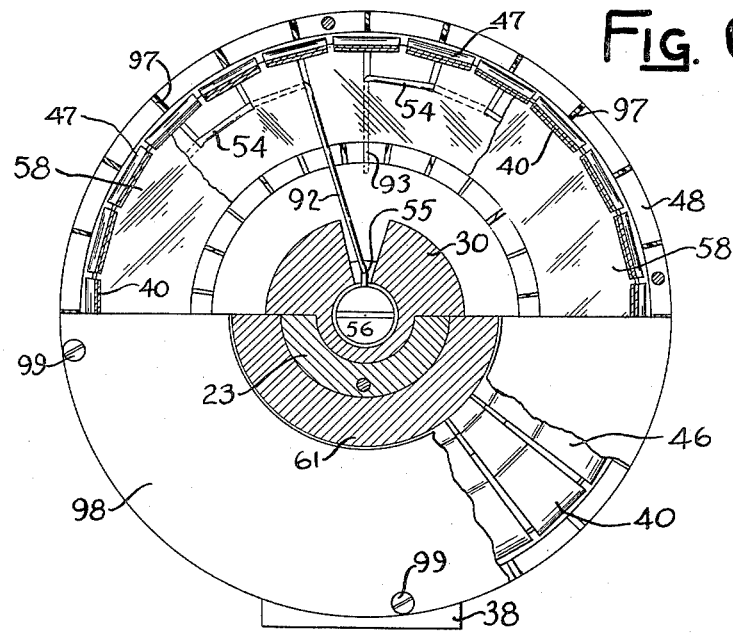
Fig. 6 is a detail sectional view, taken as on line 6—6 in Fig. 4.
Figure 7:
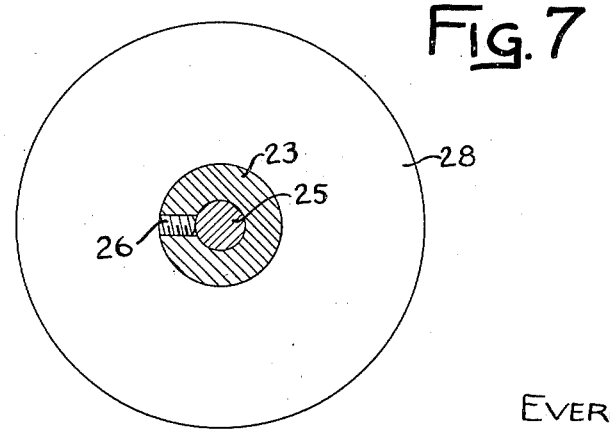
Fig. 7 is a detail sectional view, on a reduced scale, taken as on line 7—7 in Fig. 4.

With respect to the drawings and the numerals of reference thereon, 10 denotes a heating plant or furnace of common or preferred construction, 11 indicates a heater casing of the heating plant or furnace providing a hood or plenum chamber 12 in surrounding relation to a combustion chamber (not shown) of said heating plant or furnace adapted to be supplied with heating medium for an ordinary or preferred type of burner (not shown), 13 represents an outlet duct leading from said hood or plenum chamber, as, for example, to a space or room to be heated, 14 designates a blower for forcing air to and through the hood or plenum chamber 12 into the outlet duct 13, and 15 denotes an electric motor for actuating or driving the blower 14.

The air conditioning system includes mechanism, denoted generally at 16, for alterably controlling and regulating operation of said blower 14 in response to changes in temperature of a heat responsive element 17 of said air conditioning system.

The blower 14 is driven by the electric motor 15 through the medium of a belt 18 which rides a pulley 19 fixed upon a driving shaft 20 for said blower and also rides a V-pulley 21 which is rigid with a self-oiling bushing 22 revoluble and slidable upon a shaft 23 driven by the electric motor 15.

The shaft 23 driven by said electric motor 15 includes a central opening 24, which extends longitudinally through said shaft 23, in the inner end portion of which the motor shaft 25 is adapted to be rigidly secured, as by a set screw 26, and the shaft 23 also includes an internal thread 27 which bounds the outer end portion of said central opening 24.

Said shaft 23 driven by the electric motor integrally supports an annular element 28, situated at the inner side of the V-pulley 21, and an annular friction disc 29, in surrounding relation to the shaft 23, has a flat inner surface thereof arranged in contiguous relation to a flat outer surface of the annular element 28 disposed in a plane perpendicular to the axis of the shaft 23 and a flat outer surface thereof arranged in contiguous relation to a flat inner surface of the V-pulley 21 disposed in a plane perpendicular to said shaft 23. That is, the annular friction disc 29 is situated between the annular element 28 and the adjustable V-pulley 21. It may be fixed to either said annular element or to said V-pulley, but not to both.

A hollow fixture 30 is threadably received in the internal thread 27 of the shaft 23 driven by the electric motor 15, and said hollow fixture 30 is supported in a bearing 31 situated in spaced relation to the electric motor 15. A casing of said electric motor is represented 32. More explicity, the hollow fixture 30 includes a reduced inner end portion 33 having an external thread 34 received by the internal thread 27 in such manner that an interior circumferential shoulder 35 of said hollow fixture is fitted up against the adjacent end of the shaft 23, and the hollow fixture includes a reduced outer end portion 36 rotatably mounted in the bearing 31. Said hollow fixture 30 also includes an intermediate portion 37 of cross-sectional dimension as shown about equal to the cross-sectional dimension of the reduced inner end portion 33. The hollow fixture 30 and parts rigid therewith are adapted to be rotated in the bearing 31, and the construction and arrangement will be such that there will be no longitudinal movement of said hollow fixture relative to said bearing.

A block 38 of insulating material, situated at the outer side of the bearing 31, is fixed, as by screw bolts 39, to said bearing 31 up against a washer situated between the bearing and said block 38.

A plurality of separate and independent bi-metallic strips, each denoted 40 and of general U-shape, are supported in spaced apart relation to each other upon and about the hollow fixture 30. More explicitly, each of the bi-metallic strips 40 includes an outer arm 41 thereof which has its interior free end portion 42 engaged against an annular shoulder 43, provided by an insulating block 44 fixed, as by a screw bolt 63, upon the intermediate portion 37 of the hollow fixture 30, and situated between said annular shoulder 43 and an annular insulating member 45 fixed upon and perpendicular to the reduced outer end portion 36 of said hollow fixture. The construction and arrangement will be such that the interior free end portions 42 of the outer arms 41 of the bi-metallic strips 40 will be grasped and rigidly held between the annular shoulder 43 and the annular insulating member 45. Each bi-metallic strip 40 also includes an inner arm 46 thereof which is situated in spaced, alined relation to the outer arm 41, and the outer and inner arms 41 and 46 are integrally connected at the base 47 of each bi-metallic strip 40. Each base 47 is situated exteriorly of said outer and inner arms 41 and 46. An annular flange 48 upon the exterior margin of the annular insulating block 45 is as disclosed in spaced, overlying relation to the bases 47 of the bi-metallic strips 40.

Spaced apart openings 49 through the annular insulating member 45, in spaced, surrounding relation to the hollow fixture 30, are in adjacent relation to the outer arms 41 of the bi-metallic strips 40, and a closure plate 50 for said spaced apart openings 49 is adjustably supported upon the outer surface of said annular insulating block 45. More explicitly, the closure plate 50 includes spaced apart, elongated, arc shape slots 51 adapted to receive set screws 52 threaded into the annular insulating block 45, and said closure plate also includes spaced apart openings 53 adapted to be alined or partially alined with the spaced apart openings 49 in said annular insulating block. The construction and arrangement will be such that the closure plate 50 can be rotatably adjusted relative to the annular insulating block 45 thus to adjust and regulate the sizes of passages for air, each constituted as an opening 49 and an opening 53, through said closure plate and annular insulating block. The annular flange 48 rigidly supports spaced apart, interiorly situated fan blades 97 which are situated in adjacent relation to the inner arms 46 of the bi-metallic strips 40, at the side of said bi-metallic strips opposite the spaced apart openings 49 and 53. An annular plate on the annular flange 48 at the inner sides of the fan blades 97, or sides of said fan blades spaced from the annular insulating block 45, is denoted 98, and said annular flange 48 is open at locations between and exterior to said fan blades 97. As disclosed, the annular plate 98 is secured to the annular flange 48 by screw bolts 99.

A resistance element 54, constituted as resistance wire in mica, is suitably and conveniently supported, as at 55, upon the inner end of a contact screw 56 insulatively fixed within the hollow fixture 30 and is situated between the outer and inner arms 41 and 46 of the bi-metallic strips 40 in surrounding relation to said hollow fixture 30. Enamel-like, annular discs, denoted 57 and 58, respectively, lie between the resistance wire in mica and the outer and inner arms 41 and 46 of the bi-metallic strips 40, in spaced, surrounding relation to the hollow fixture. The annular discs 57 and 58 are adapted to electrically insulate the resistance wire from the bi-metallic strips and, at the same time, permit heat from said resistance wire to be absorbed by said bi-metallic strips. Stated otherwise, said annular discs 57 and 58 are electrical current resistors but not heat resistors.

The inner arm 46 of each bi-metallic strip 40 includes an interior free end portion 59 which is bent inwardly toward and alined with the self-oiling bushing 22, and the interior free end portions 59 all lie in a single circumference which is concentric to the shaft 23 driven by the electric motor 15. The inner free ends 60 of said interior free end portions 59 all terminate in a single plane perpendicular to the axis of the shaft 23, and the bi-metallic strips 40 together constitute a thrust entity of the mechanism 16.

A thrust ring 61, slidably situated upon an outer end portion of the shaft 23 driven by the electric motor 15 between the interior free end portions 59 of the inner arms 46 of the bi-metallic strips 40 and the outer end of the self-oiling bushing 22, is retained upon said shaft 23 by the circumferential shoulder 35 provided by the hollow fixture 30 at the outer side of said thrust ring 61.

The electric motor 15 desirably is maintained in continuous operation when the temperature of air in the hood or plenum chamber 12 is at or above a predetermined minimum temperature, as, for example, about 100° F., and devices, including the heat responsive element 17, are present for rendering said electric motor 15 operative whenever temperature of air in said hood or plenum chamber at or above said predetermined minimum temperature exists and inoperative whenever temperature of air in the hood or plenum chamber below said predetermined temperature exists. The resistance element 54 is adapted to be energized by electric energy thus to cause the outer and inner arms 41 and 46 of the bi-metallic strips 40, respectively, to become gradually spaced farther and farther apart and the V-pulley 21, the annular friction disc 29 and the annular element 28 to be clutched together, and the construction and arrangement are such that when the temperature of air in the hood or plenum chamber reaches said predetermined minimum temperature which causes the electric motor to be made operative, or energized, pressure exerted by the bi-metallic strips 40 upon the V-pulley 21 is insufficient to cause said V-pulley and the blower 14 to be operated. That is, said bi-metallic strips are adapted to exert no appreciable pressure against the thrust ring 61 at the time of starting up of the electric motor 15, so that the V-pulley 21, the annular element 28 and the annular friction disc 29 will be under insufficient pressure to cause rotation of said V-pulley 21 and the blower driving shaft 20 to occur when the shaft 23 is set in operation in response to energization of the electric motor 15. Thus, said electric motor is adapted to be started up under no load. As the temperature rises in the hood or plenum chamber 12 after the electric motor 15 is set in operation, said heat responsive element 17 is adapted to be actuated to cause a circuit including the resistance element 54 to be closed thus to cause said resistance element to be energized. As the energized resistance element 54 causes the bi-metallic strips 40 to be heated up, the outer and inner arms 41 and 46 of the separate and independent bi-metallic strips 40, respectively, become gradually spaced apart by progressively increasing heat applied to said bi-metallic strips, and the thrust ring 61 becomes actuated inwardly, toward the left in Fig. 4, thus to cause the V-pulley 21 to be moved toward the annular friction disc 29 and the annular element 28. Stated otherwise, with increase in pressure exerted by the bi-metallic strips 40 against the thrust ring 61, the annular friction disc 29 is more tightly grasped between the V-pulley 21 and the annular element 28, and vice versa. As the friction between said V-pulley, annular friction disc and annular element becomes great enough to cause the V-pulley with the bushing 22 to be turned in response to rotation of the shaft 23 driven by the electric motor 15, said V-pulley, together with the hollow fixture 30 and parts rigid therewith, is rotated thus to cause the blower driving shaft 20 to be rotated through the medium of the belt 18. Some slippage occurs between the annular friction disc 29 and the parts engaged with said annular friction disc throughout the entire range of blower speed up to the point where pressure exerted by the bi-metallic strips 40 causes said annular friction disc to be tightly grasped, and then the V-pulley 21 and the blower driving shaft 20 are driven at the full speed of the electric motor driven shaft 23.

In the illustrated embodiment of the invention, the heat responsive element 17 is a bimetallic helix having its outer end 64 secured to a tubular member 65 fixed in the wall of the heating plant or furnace 10 and its inner end 66 secured to a rod 67 rotatably mounted in said tubular member. The tubular member 65 includes a portion 68 thereof situated at the outer side of the heating plant or furnace 10 which supports a casing 69, and the rod 67 extends outwardly to position beyond said portion 68.

An actuator arm 70, extending downwardly within the casing 69, is fixed, at 71, to the outer end portion of the rod 67, and an elongated conducting element 72, constituted as a bi-metallic blade of ordinary or preferred configuration, also extends downwardly within the casing 69 and is insulatively fixed, at 73, upon the outer end of said rod 67. The elongated conducting element or bi-metallic blade 72 is in front of and in spaced relation to the actuator arm 70, and the lower end portion 74 of said elongated conducting element or bi-metallic blade 72 extends to position below the lower end of said actuator arm 70. The lower end of the elongated conducting element or bi-metallic blade 72 supports a contactor 75 adapted to be engaged with and disengaged from a fixed contact element 76 suitably and conveniently insulatively supported on the casing 69.

An electric switch 77, at the side of the actuator arm 70 opposite the fixed contact element 76, is suitably and conveniently mounted within the casing 69 in spaced relation to said actuator arm. The electric switch 77 includes a fixed contact element 78 and a movable contact element 79 which is spring pressed toward said fixed contact element 78.

A resistance element 80, for supplying heat to the elongated conducting element or bi-metallic blade 72, has one of its ends 81 conductively connected to said elongated conducting element or bi-metallic blade and its other end 82 insulatively associated with said elongated conducting element or bi-metallic blade. The construction and arrangement will be such that the resistance element 80 will extend along and in close relation to a curvilinear portion of the elongated conducting element or bi-metallic blade 72 and also such that heat applied to said elongated conducting element or bi-metallic blade by said resistance element 80 will cause the elongated conducting element or bi-metallic blade to become warped in direction to cause the contactor 75 to be moved in direction away from the fixed contact element 76.

Incoming lead wires from a source (not shown) of electrical energy are denoted 83 and 84.

The incoming lead wire 84 extends to the electric motor 15, a lead wire 85 extends from said electric motor to the primary of a transformer 86, and a lead wire 89 extends from said primary of the transformer to the movable contact element 79 of the switch 77. The incoming lead wire 83 extends to the fixed contact element 78 of said switch 77. A lead wire 94 extends from the fixed contact element 76 to the secondary of the transformer 86, a lead wire 95 extends from said secondary to a terminal 96 suitably and conveniently supported upon the insulating block 38, and said terminal 96 is grounded to the bearing 31, etc.

A lead wire 90 extends from the resistance element 80 to a terminal 91 suitably and conveniently supported upon said insulating block 38, said terminal 91 is conductively engaged with the outer end of the insulatively supported contact screw 56, a conductor 92 extends from the inner end of said contact screw 56 to the resistance wire of the resistance element 54, a conductor 93 extends from said resistance wire of said resistance element 54 to one of the bi-metallic strips 40, and said bi-metallic strip is grounded to the thrust ring 61, etc.

A usual or preferred type of control means, including a room thermostat, for the burner of the heating plant or furnace 10 of course can be, and ordinarily will be, employed. Inasmuch as a burner control means constitutes no essential part of the present invention, the disclosure does not include a control means for the heating plant or furnace burner.

The operative parts of the air conditioning system are disclosed in Figs. 1 and 2 of the drawings in the positions they assume when the hood or plenum chamber 12 of the heating plant or furnace 10 is at a temperature below the predetermined minimum temperature selected for causing the electric motor 15 to be set in operation. The heat responsive element 17 is situated to cause the actuator arm 70 to be engaged against the spring pressed movable contact element 79 of the electric switch 77 and said movable contact element 79 to be removed from the fixed contact element 78. And said heat responsive element 17 also is situated to cause the contactor 75 upon the elongated conducting element or bi-metallic blade 72 to be in spaced relation to the fixed contact element 76, at the side of said fixed contact element 76 adjacent said electric switch 77.

With elevation of the temperature of air in the hood or plenum chamber 12 said actuator arm 70 will be moved in direction away from the electric switch 77, to the right in Figs. 1 and 2, and the movable contact element 79 will be permitted or caused to engage the fixed contact element 78 when the temperature of air in said hood or plenum chamber has reached the temperature at which it is intended the electric motor 15 shall become operative. At this time, the contactor 75 yet will be spaced a short distance from the fixed contact element 76.

Upon engagement of said fixed and movable contact elements 78 and 79 of the electric switch 77, a circuit for causing said electric motor to be energized will be completed, said circuit evidently including the fixed and movable contacts of said electric switch 77.

With additional elevation of the temperature of air in the hood or plenum chamber 12, the contactor 75 upon the elongated conducting element or bi-metallic blade 72 will be caused to engage the fixed contact element 76 when the temperature of air in said hood or plenum chamber has reached the temperature at which it is intended the resistance element 54 shall become energized and thus operative.

Upon engagement of the contactor 75 with the fixed contact element 76, a circuit for causing the resistance element 54 to be energized will be completed, said circuit being traced from the secondary of the transformer 86 through the lead wire 95 and the terminal 96 to ground, thence from ground through the conductor 93, the resistance element 54, the conductor 92 and the contact screw 56 to the terminal 91, thence through the lead wire 90 to the resistance element 80 and the elongated conducting element or bi-metallic blade 72, and thence through said fixed contact element 76 and the lead wire 94 back to said secondary. Clearly, the fixed contact element 76 and said elongated conducting element or bi-metallic blade 72 can be set relative to each other so that the contactor 75 and said fixed contact element 76 will become engaged when the temperature of air in the hood or plenum chamber 12 has any value which may be selected. The fixed and movable contact elements 78 and 79 of the switch 77 are adapted to be engaged in response to rise of temperature of air in the hood or plenum chamber to a predetermined temperature and to be disengaged when the temperature of air in said hood or plenum chamber is below said predetermined temperature, and said contactor 75 and fixed contact element 76 are adapted to become engaged in response to an appreciable rise of temperature of air in the hood or plenum chamber and to become disengaged in response to an appreciable fall of temperature of air in said hood or plenum chamber.

Closing of the circuit including the resistance element 54 will cause said resistance element to be heated and the bi-metallic strips 40 to absorb heat. The arms of said bi-metallic strips will have tendency to move apart gradually and progressively when heated by the resistance element 54, and since the outer arms 41 of the bi-metallic strips 40 are anchored, the inner arms 46 of said bi-metallic strips will be forced inwardly thus to cause the speed of rotation of the blower to be altered in the manner and with the results as hereinbefore set forth.

Attention is called to the fact that the layer of metal at the interior side of each bi-metallic strip 40 has a greater coefficient of expansion than the layer of metal at the exterior side of the bi-metallic strip. Thus, the resistance element 54 applies its heat directly to the more expansible metal and the spreading action of the arms of the bi-metallic strips is positive and relatively quick.

It will be evident that the construction and arrangement can be such that the speed of rotation of the blower can be increased from zero speed to maximum speed, and decreased from maximum speed to zero speed, in any interval of time which may be selected. It is obvious that the time period will depend upon various factors surrounding the bi-metallic strips 40, the resistance element 54, etc., and the characteristics of the electrical energy employed. By way of example, an installation inherently can include provision for increase of speed of the blower employed from zero speed to maximum speed in three minutes, more or less.

The construction and arrangement including the spaced apart openings 49 and 53, the fan blades 97, etc., obviously constitutes means through the instrumentality of which increase of speed of rotation of the blower in any interval of time which may be predetermined can be accurately controllably accomplished. Desirably, the electric motor 15 can be a substantially constant speed motor. The motor driven shaft 23 and the parts rigid with said motor driven shaft, including a force unit consisting of the bi-metallic strips 40, the resistance element 54, the hollow fixture 30, the insulating block 43, the annular insulating block 45 and its fan blades 97, etc., are assembled with the electric motor shaft 25 to be continuously rotated at the speed of said motor shaft at all times while the electric motor is in operation. The construction and arrangement will be such that air will be drawn or sucked by the fan blades 97 through the spaced apart openings 49 and 53 over the bi-metallic strips 40 and radially out of the unit constituting the mechanism 16 at the side of said bi-metallic strips 40 opposite said spaced apart openings 49 and 53. It will be evident that by adjustment of the closure plate 50 thus to adjust and regulate the sizes of the passages for air through said closure plate and the annular insulating block 45, by way of the spaced apart openings 49 and 53, the temperature within the mechanism 16 in surrounding relation to the bi-metallic strips 40 can be kept at any substantially constant value which may be selected. The smaller the sizes of the passages for air, the higher the temperature constantly maintained at the location of and about the bi-metallic strips, and the larger the sizes of said passages for air, the lower the overall temperature at and about said bi-metallic strips.

Save for the resistance element 80, the contactor 75 and the fixed contact element 76 normally would remain engaged at all times when the temperature of air in the hood or plenum chamber 12 is at or above the temperature at which said contactor 75 and said fixed contact element 76 became engaged. In the disclosure as made, the resistance element 80 becomes energized the instant the contactor 75 and the fixed contact element 76 become engaged. Almost immediately after energization of said resistance element 80, the elongated conducting element or bi-metallic blade 72 becomes warped, in response to absorption of heat from the resistance element 80, to cause the contactor 75 to be moved in direction away from the fixed contact element 76, toward the left in Fig. 2 of the drawings. Immediately upon breaking of the electric circuit which includes said resistance element 80, by separation of said contactor 75 and fixed contact element 76, the resistance element 80 becomes de-energized. A very short time after de-energization of the resistance element 80, the elongated conducting element or bi-metallic blade 72 becomes warped, in response to dissipation of heat, to cause the contactor 75 to be moved in direction toward the fixed contact element 76. Assuming the furnace temperature in the meantime to be rising, the heat responsive element 17 will have caused said elongated conducting element or bi-metallic blade 72 to be swung bodily slightly in direction toward said fixed contact element 76 while the resistance element 80 remained de-energized. In short order, the contactor 75 and the fixed contact element 76 again will become engaged with the same result as above described. After several, or a number of, repeated energizations and de-energizations of said resistance element 80 have occurred the heat responsive element 17 will have swung the elongated conducting element or bi-metallic strip 72 bodily in direction toward the fixed contact element 76 through a distance too great to permit the resistance element 80, even though energized, to warp said elongated conducting element or bi-metallic blade 72 to sufficient extent to cause the contactor 75 and the fixed contact element 76 to become disengaged. When this condition occurs, the resistance element 54 constantly will remain energized. In practical operation, the net result will be that the contactor 75 and the fixed contact element 76 will remain engaged for very short intermittent periods of time, thus to cause the resistance element 54 to be energized for very short intermittent periods of time, when the temperature in the hood or plenum chamber 12 is at or close to the temperature intended to cause said contactor 75 and fixed contact element 76 to become engaged, will remain engaged for increasingly longer intermittent periods of time, to cause said resistance element 54 to be energized for increasingly longer periods of time, as the temperature in said hood or plenum chamber rises, and will remain constantly engaged, to cause the resistance element 54 to be constantly energized, when the temperature in said hood or plenum chamber is considerably above said temperature intended to cause the contactor 75 and fixed contact element 76 to become engaged. The action as described will cause the bi-metallic strips 40 to become evenly and uniformly heated. While the temperature in the hood or plenum chamber is rising in response to firing up of the heating plant or furnace burner, the bi-metallic strips 40 will be receiving heat intermittently in increasing quantities from the resistance element 54 and the heat applied to said bi-metallic strips will have opportunity to become evenly and uniformly distributed to and about all of the bi-metallic strips thus to render them capable of quite efficiently and satisfactorily accomplishing their intended service during the time they are causing the blower to be speeded up. The intermittent application of heat to the bi-metallic strips 40 is provision for relatively low average temperature of said bi-metallic strips, and, consequently, relatively low fan speed during the time of warming up of the furnace. The bi-metallic strips 40 have body and weight much greater than the body and weight of the resistance element 80 so that said bi-metallic strips will lose their heat much more slowly than will said resistance element 80. When the temperature in the hood or plenum chamber dictates continuous driving of the blower at the speed of the electric motor 15, so that the V-pulley 21 is rigid with the motor driven shaft 23, the bi-metallic strips 40 will be receiving heat in constant quantity from said resistance element 54. Immediately when the temperature of air in the hood or plenum chamber 12 starts to fall, due to cessation of operation of the heating plant or furnace burner, or for any other reason, the contactor 75 will have tendency to commence to recede and become disengaged from the fixed contact element 76 thus eventually to cause both of the resistance elements 54 and 80 to be de-energized. Said resistance elements at once will begin to cool off and the outer and inner arms 41 and 46 of the bi-metallic strips 40 will simultaneously begin to move toward each other thus eventually to cause or permit the V-pulley 21 to be released. The blower 14 will cease operating when the temperature in the hood or plenum chamber 12 falls just below the temperature which caused said contactor 75 and the fixed contact element 76 to become engaged and said blower to become operative.

In Fig. 8 of the drawings, an elongated conducting element 72', constituted as a bi-metallic blade equivalent to the bi-metallic blade 72, includes a contactor 75' adapted to engage contacts of a rheostat 101. Said rheostat 101 is connected to a lead wire 94' adapted to extend to the secondary of a transformer such as 86, and said elongated conducting element 72' is connected to a lead wire 90' adapted to extend to a terminal such as 91. The action of an air conditioning system made according to the invention and including a rheostat arranged as in Fig. 8, of course in lieu of a resistance element such as 80 arranged as in Figs. 1 and 2, obviously will cause heat in increasing quantities to be applied to a resistance element such as 54 with rise of temperature in a hood or plenum chamber. It will be evident that swinging movement of the elongated conducting element 72' toward the right in Fig. 8 will progressively reduce resistance of the rheostat 101 thus to cause potential applied to a resistance element such as 54 to be increased.

No matter what may be the actual temperature in the hood or plenum chamber 12, or whether the heating plant or furnace 10 is heating up or cooling off, operation of the blower 14 will be in response to temperature of air in said hood or plenum chamber. The velocity and volume of air forced to and through the hood or plenum chamber will be progressively and accurately controlled and regulated through a selected range of values, predetermined by the construction and arrangement of the bimetallic strips 40, the resistance element 54, etc., etc., and the electrical energy employed, by adjustment of the multiple speed drive in direct response to the temperature in the hood or plenum chamber. Clearly, the fan blades 97, the spaced apart openings 49 and 53, etc., constitute means whereby increase of speed of rotation of the blower in any predetermined interval of time which may be selected can be accurately controllably accomplished.

The bi-metallic helix which constitutes the heat responsive element 17 desirably will be relatively thin and thus capable of quickly absorbing heat from air in motion as it travels through the hood or plenum chamber past said heat responsive element. The heat responsive element or bimetallic helix is required to perform functions which are quite simple and necessitate but little effort or power.

The principles of the invention are applicable to various types of air heating and cooling systems.

What is claimed is:

1. In an air conditioning system, a blower, a driving shaft, an element rigid with said shaft, a drive interposed between said element and said blower for causing the blower to be actuated at variable speeds in response to actuation of said shaft at constant speed, said drive including mechanism in spaced relation to said element adapted to be expanded in response to rise of temperature to cause said blower to be actuated at higher speeds and to be contracted in response to fall of temperature to cause the blower to be actuated at lower speeds, resistance means for causing said mechanism to be heated, and a circuit for causing said resistance means selectively to be energized and de-energized.

2. In an air conditioning system, a blower, a driving shaft, an element rigid with said shaft, a friction drive upon said shaft between said element and said blower, mechanism fixed upon said shaft in spaced relation to said element adapted to be expanded in response to rise of temperature to operate said friction drive to cause said blower to be actuated at higher speeds and to be contracted in response to fall of temperature to operate the friction drive to cause the blower to be actuated at lower speeds, resistance means fixed to rotate with said shaft for causing said mechanism to be heated, and a circuit for causing said resistance means selectively to be energized and deenergized.

3. In an air conditioning system, a blower, a driving shaft, a first clutch element rigid with said shaft, a second clutch element freely rotatable upon said shaft, a drive interposed between said second clutch element and said blower, mechanism fixed upon said shaft at the side of said second clutch element opposite said first clutch element adapted to be expanded in response to rise of temperature to operate said second clutch element into engagement with said first clutch element to cause said blower to be actuated at higher speeds and to be contracted in response to fall of temperature to release the second clutch element from the first clutch element to cause the blower to be actuated at lower speeds, resistance means fixed to rotate with said shaft for causing said mechanism to be heated, and a circuit for causing said resistance means selectively to be energized and deenergized.

4. In an air conditioning system, a blower, a driving shaft, an element rigid with said shaft, a friction drive upon said shaft between said element and said blower, mechanism fixed upon said shaft in spaced relation to said element adapted to be expanded in response to rise of temperature to operate said friction drive to cause said blower to be actuated at higher speeds and to be contracted in response to fall of temperature to operate the friction drive to cause the blower to be actuated at lower speeds, resistance means fixed to rotate with said shaft for causing said mechanism to be heated, a circuit for causing said resistance means selectively to be energized and deenergized, and means for causing air in predetermined amount constantly to travel past said mechanism and said resistance means.

5. In an air conditioning system, a blower, a driving shaft, a first clutch element rigid with said shaft, a second clutch element freely rotatable upon said shaft, a drive interposed between said second clutch element and said blower, mechanism fixed upon said shaft at the side of said second clutch element opposite said first clutch element adapted to be expanded in response to rise of temperature to operate said second clutch element into engagement with said first clutch element to cause said blower to be actuated at higher speeds and to be contracted in response to fall of temperature to release the second clutch element from the first clutch element to cause the blower to be actuated at lower speeds, resistance means fixed to rotate with said shaft for causing said mechanism to be heated, a circuit for causing said resistance means selectively to be energized and deenergized, and means including adjustable air passages and fan blades rotatable with said shaft for causing air in predetermined amount constantly to travel past said mechanism and said resistance means.

EVERETT H. WHITE.

REFERENCES CITED

The following references are of record in the file of this patent:

UNITED STATES PATENTS

| Number | Name | Date |
|---|---|---|
| 1,977,538 | Anderson | Oct. 16, 1934 |
| 2,052,536 | Shivers | Aug. 25, 1936 |
| 2,158,250 | Peters | May 16, 1939 |
| 2,181,606 | Parks | Nov. 28, 1939 |
| 2,238,219 | Fineran | Apr. 15, 1941 |
| 2,265,294 | Lange | Dec. 9, 1941 |
| 2,308,507 | Hallinan | Jan. 19, 1943 |
| 2,322,405 | White | June 22, 1943 |
| 2,329,131 | Ottmar | Sept. 7, 1943 |
| 2,353,350 | Millerwise | July 11, 1944 |
| 2,369,681 | Miles | Feb. 20, 1945 |